US009479065B2

United States Patent
Mao et al.

(10) Patent No.: US 9,479,065 B2
(45) Date of Patent: Oct. 25, 2016

(54) CONTROLLER SUPPLY TERMINAL BOOSTING

(71) Applicant: Power Integrations, Inc., San Jose, CA (US)

(72) Inventors: Mingming Mao, Saratoga, CA (US); Michael Yue Zhang, Mountain View, CA (US); Tiziano Pastore, Los Gatos, CA (US); Yury Gaknoki, San Jose, CA (US); Ricardo Luis Janezic Pregitzer, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 94 days.

(21) Appl. No.: 14/623,908

(22) Filed: Feb. 17, 2015

(65) Prior Publication Data

US 2016/0111962 A1    Apr. 21, 2016

Related U.S. Application Data

(60) Provisional application No. 62/065,344, filed on Oct. 17, 2014.

(51) Int. Cl.
*H02M 1/36* (2007.01)
*H02M 3/335* (2006.01)
*H02M 7/217* (2006.01)
*H02M 1/00* (2006.01)

(52) U.S. Cl.
CPC ........... *H02M 3/33507* (2013.01); *H02M 1/36* (2013.01); *H02M 7/217* (2013.01); *H02M 2001/0006* (2013.01)

(58) Field of Classification Search
CPC ..... H02M 1/08; H02M 1/36; H02M 3/33507
USPC ............... 363/21.08, 21.16, 49, 97
See application file for complete search history.

(56) References Cited

U.S. PATENT DOCUMENTS

| | | | | |
|---|---|---|---|---|
| 2013/0077353 A1* | 3/2013 | Kuang | ............... | H05B 33/0815 363/20 |
| 2013/0272037 A1* | 10/2013 | Aiello | ............... | H02M 3/33507 363/21.17 |
| 2014/0204623 A1* | 7/2014 | Djenguerian | ........... | H02M 1/36 363/21.12 |
| 2014/0204624 A1* | 7/2014 | Djenguerian | ..... | H02M 3/33523 363/21.12 |
| 2015/0062768 A1* | 3/2015 | Prescott | .................. | H02M 1/32 361/86 |
| 2016/0111961 A1* | 4/2016 | Balakrishnan | .... | H02M 3/33507 363/21.12 |
| 2016/0111962 A1* | 4/2016 | Mao | .................. | H02M 3/33507 363/21.16 |
| 2016/0149504 A1* | 5/2016 | Quigley | .................. | H02M 1/36 363/21.04 |

* cited by examiner

*Primary Examiner* — Jeffrey Sterrett
(74) *Attorney, Agent, or Firm* — Blakely Sokoloff Taylor & Zafman LLP

(57) ABSTRACT

A power conversion device includes a power switch a first main terminal coupled to a higher potential portion, a second main terminal coupled to a lower potential portion, and a tap coupled to the first main terminal to provide a current for charging a supply terminal capacitor. A controller is coupled to a control terminal of the power switch to control switching of the power switch to produce a regulated output. A supply terminal is to be coupled to a supply terminal capacitor to store a charge for supplying power to at least some of the components of the controller. A voltage regulator is coupled to regulate the charge stored and a potential on the supply terminal capacitor. The current for charging the supply terminal capacitor is selectively drawn from the tap of the power switch in response to the supply terminal capacitor being below a threshold.

21 Claims, 6 Drawing Sheets e.g; Normal Supply Level 5V; Boosted Supply Level 5.25V; UV-threshold 4.5V

CONTROLLER SUPPLY TERMINAL BOOSTING

REFERENCE TO RELATED APPLICATION

This application claims the benefit of U.S. Provisional Application No. 62/065,344, filed Oct. 17, 2014.

BACKGROUND INFORMATION

1. Field of the Disclosure

The present invention is generally related to power converters, and more specifically, to boosting power converter controller supplies.

2. Background

A power converter controller typically receives power for its internal blocks from a supply terminal. In some instances, this supply terminal may sometimes also be referred to as a bypass (BP) terminal, or sometimes as a $V_{DD}$ supply. A large group of power converters, such as for example flyback converters, include magnetic isolation or transformer with two or more windings (sometimes referred to as the energy transfer element comprising two or more coupled inductors). In power converters with transformer the voltage to the bypass terminal is provided during normal operation after startup through an extra auxiliary winding (sometimes referred to as a third winding or a second of the coupled inductors) on the transformer core. Thus an auxiliary winding sometimes may also be referred to as a supply or bypass winding. The ac induced voltage on the auxiliary winding is rectified and filtered on a supply terminal capacitor coupled to the bypass terminal and the auxiliary winding to generate a dc supply voltage on the bypass terminal.

At startup, before the voltage on the supply terminal capacitor coupled to the bypass terminal and the auxiliary winding is charged to a regulated voltage, supply voltage may be provided from some external source, such as the input dc bus, to the supply terminal capacitor. The voltage on the supply terminal capacitor coupled to bypass terminal and the auxiliary winding may then be regulated after startup during normal operation though the power converter controller and/or shunt regulator after the supply terminal capacitor is charged. A slow charge up of the supply voltage on the supply terminal capacitor during startup delays normal operation of the power converter controller until after the startup operation is complete.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
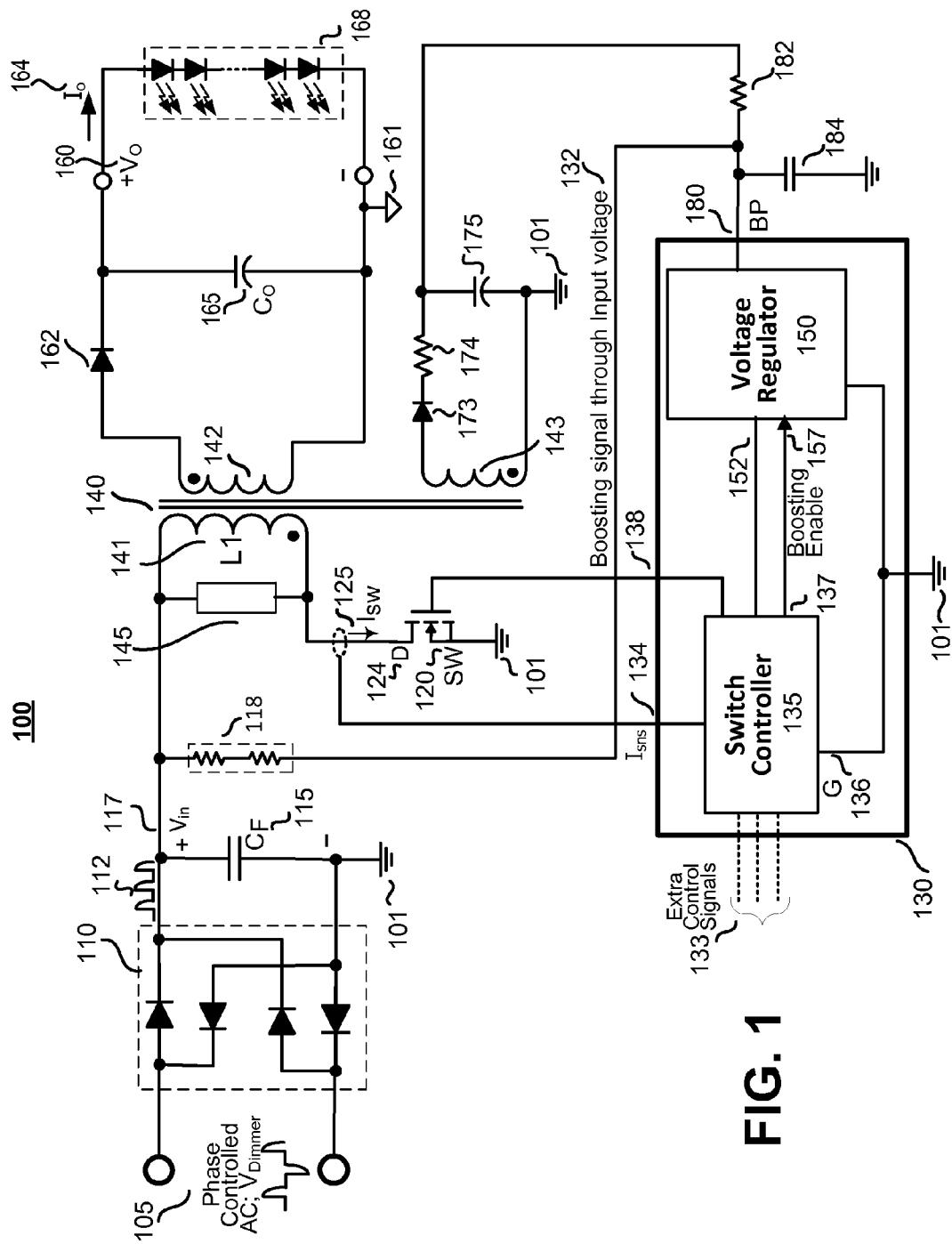
FIG. 1 is a schematic illustrating an example circuit for a flyback off line power converter including a discrete switcher and controller with supply boosting through an input line in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, various examples of a power conversion device including a controller with a supply terminal that is boosted when the potential on the supply terminal capacitor drops below a threshold (e.g., during startup) are disclosed. In one example, a power conversion device includes a power switch coupled between a higher potential of the power conversion device and a lower potential of the power conversion device. In operation, the power switch isolates the higher potential portion of the power conversion device from the lower potential portion of the power conversion device in an open state, and provides a current conduction path between the higher and lower potential portions of the power conversion device in a closed state. A controller is coupled to control switching of the power switch between the open state and the closed state to produce a regulated output. A supply terminal of the power conversion device is to be coupled to a supply terminal capacitor to store a charge for supplying power to at least some of the components of the controller. A voltage regulator of the power conversion device is to be coupled to regulate the charge stored/potential on the supply terminal capacitor. A current for charging the supply terminal capacitor is selectively drawn from the higher potential portion of the power conversion device (in one example during a startup condition).

To illustrate, FIG. 1 is a schematic illustrating an example power converter 100 including a discrete switcher and controller with supply boosting through an input line in accordance with the teachings of the present invention. It is appreciated that although the example power converter illustrated in FIG. 1 is a flyback converter for explanation purposes, in accordance with the teachings of the present invention other power converter topologies may also include a controller with a control terminal that is boosted during startup or under any condition that the potential on the supply terminal capacitor may drop below a threshold. In one example, power converter 100 is coupled to receive a rectified phase controlled input voltage $V_{in}$ 117, an example of which is also illustrated in FIG. 1 with waveform 112. In one example, the rectified phase controlled input voltage $V_{in}$ 117 is received from a dimmer phase controlled AC voltage $V_{Dimmer}$ 105 through a bridge rectifier 110 across a filter capacitor $C_F$ 115.

Input voltage $V_{in}$ 117 is applied to the primary winding inductor L1 141 of the transformer 140, which is coupled in series with a switching element SW 120. In one example, switching element SW 120 is a MOSFET. In various examples, a clamping circuit 145 may be coupled across the primary winding L1 141 as shown to clamp a turn off spike resulting from the leakage inductance of the winding L1 141 from exceeding a maximum voltage tolerance of the switching element SW 120.

In one example, the switching element SW 120 is switched to produce a regulated output. The switching of switching element SW 120 chops the input voltage $V_{in}$ 117 into high frequency (HF) pulses, and transfers energy through the transformer 140 to the secondary winding 142 and the series coupled rectifier diode 162 to apply a dc output voltage $V_o$ 160 across the output capacitor $C_o$ 165 and load 168 as shown. In one example, the output load 168 may be a string of LEDs that draws the regulated output current $I_o$ 164. Due to the isolation in transformer 140 between the primary and secondary windings 141 and 142, the input and output circuits on the primary and secondary sides of the power converter 100 have different separate reference nodes 101 and 161, as shown.

In the example depicted in FIG. 1, it is noted that with control unit 130 being referenced to input reference node 101 as shown, power converter 100 is a primary side controlled converter. As shown in the depicted example, an output control signal may be received at bypass BP terminal 180 of control unit 130 through an auxiliary winding 143 of the transformer 140. In addition, the output control signal may also provide a supply voltage, which may also be referred to as a bypass voltage, to provide power for the internal control blocks or internal circuitry of control unit 130. HF pulses across the auxiliary winding 143 caused by the switching of switching element SW 120 are rectified and filtered through diode 173, resistor 174, and capacitor 175, and are coupled to be applied to the bypass BP terminal 180 through a resistor 182 and a small decoupling capacitor 184 coupled to the bypass BP terminal 180.

As shown in FIG. 1, controller 130 includes a voltage regulator 150 coupled to a switch controller 135. In the example, switch controller block 135 is coupled to receive a regulated supply voltage 152 provided by voltage regulator 150 in response to the unregulated bypass supply voltage received at bypass BP terminal 180. In one example, a ground pad G 136 of switch controller block 135 is referenced to the primary reference level 101, which is also coupled to voltage regulator 150, as shown.

In one example, switch controller 135 is coupled to receive a sensed current $I_{sns}$ 134 signal, which is representative of a current $I_{sw}$ 125 through drain D 124 of the switching element 120. In one example, switch controller 135 is coupled to receive a sensed current $I_{sns}$ 134, which may be utilized by switch controller 135 to implement a switching pulse current limit feature for switching element SW 120. As illustrated in the depicted example, extra control signals 133 may also be received by switch controller 135 to generate switching signal 138 to control the switching of switching element SW 120 to transfer energy from the primary (input) side of power converter 100 to the secondary (output) side of the power converter 100.

During normal operation of power converter 100, the bypass terminal BP 180 coupled to capacitor 184 and resistor 182 is coupled to be charged by the output of bypass winding 143 through diode 173, resistor 174, and capacitor 175. However, in one example, during startup before normal operation, or under any condition that a voltage across capacitor 184 falls/drops below a threshold, the voltage across capacitor 184 is selectively boosted from a high voltage source in accordance with the teachings of the present invention. For instance, in the example depicted in FIG. 1, the voltage across capacitor 184 is selectively boosted at a quick pace in a short time interval during startup through the input line in the case of discrete switching element SW 120 in FIG. 1. In another example, as will discussed in greater detail below with respect to FIG. 2, the voltage across capacitor 184 may be selectively boosted at a quick pace in a short time interval through a tap terminal in accordance with the teachings of the present invention. It is noted that during the short time interval that capacitor 184 is boosted from the high voltage source, power losses due to the utilization of the high voltage source may temporarily increase. However, in one example, as soon as the voltage across capacitor 184 is boosted back to a threshold, the normal charging of capacitor 184 from the output of bypass winding 143 may resume, which allows the normal power consumption and efficiency of power converter 100 to return to normal levels during the normal operation of power converter 100 in accordance with the teachings of the present invention.

For instance, in the example depicted in FIG. 1, at startup or under any condition that the voltage across capacitor 184 falls/drops below a predefined threshold, capacitor 184 is selectively coupled to be boosted through the high voltage source of the input voltage $V_{in}$ 117 of input line. In the depicted example, the boosting voltage from input voltage $V_{in}$ 117 is applied for a boosting time interval to the capacitor 184 through a resistor module 118 coupled to the input line. During the time interval of boosting, the high voltage source of $V_{in}$ 117 charges the capacitor 184, which is coupled to the BP terminal 180. In startup condition, boosting through a high voltage source may provide enough time for the voltage across the auxiliary winding 143 to build up to the threshold. In one example, as soon as auxiliary winding 143 voltage is charged to a sufficient level, the auxiliary winding 143 takes over charging capacitor 184, which allows power consumption and efficiency resume to their normal levels during the normal operation of power converter 100 in accordance with the teachings of the present invention.

Figure 2:
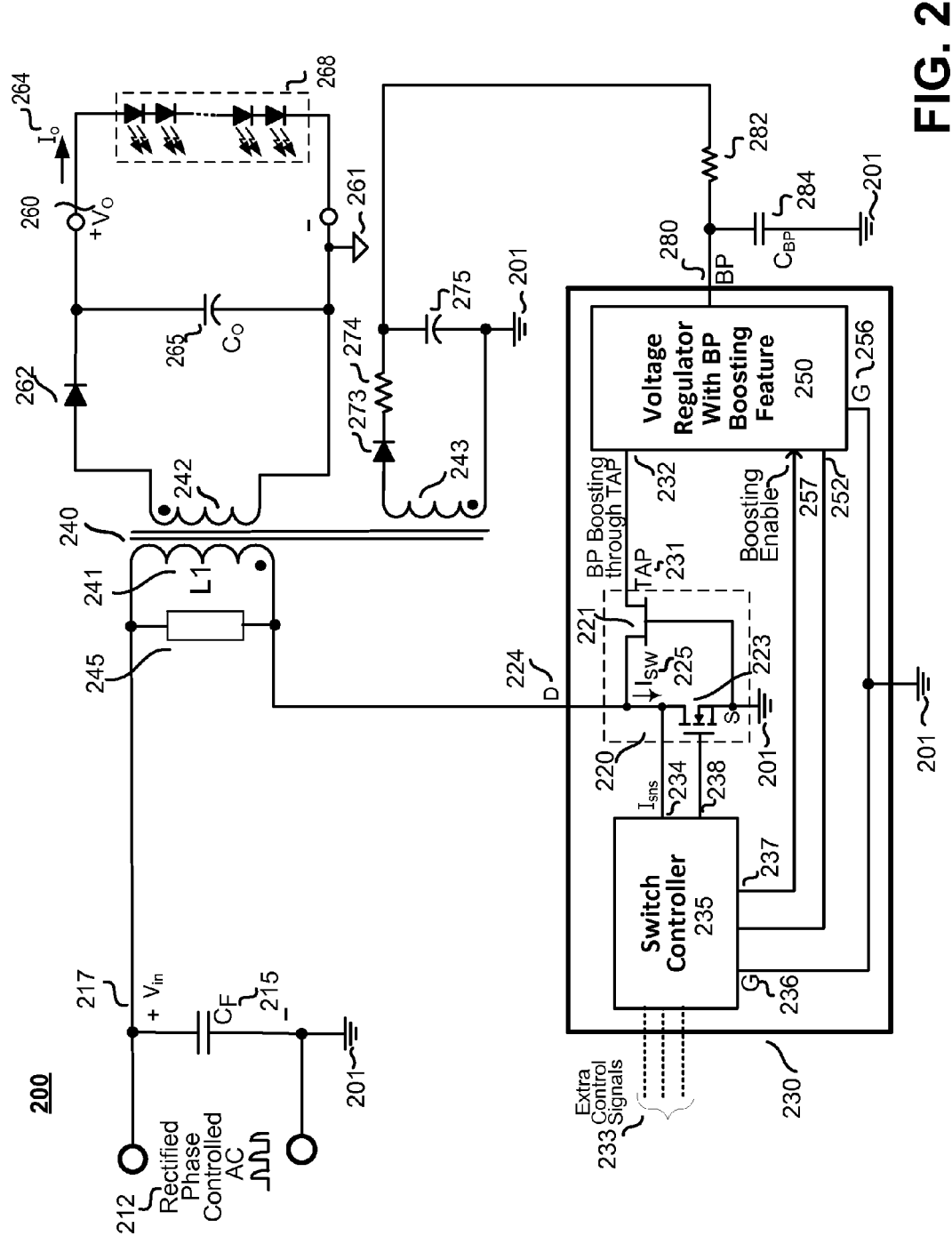
FIG. 2 is a schematic illustrating an example flyback power converter including an integrated switcher having a tap and a controller with supply boosting through the tap in accordance with the teachings of the present invention.

FIG. 2 is a schematic illustrating another example of power converter 200, which includes an integrated switcher, or switching element having a tap, and a controller including a voltage regulator with a BP boosting feature in accordance with the teachings of the present invention. In the depicted example, power converter 200 is a flyback power converter. It is appreciated that a flyback power converter topology is illustrated in FIG. 2 for explanation purposes, and that other power converter topologies may also be utilized in accordance with the teachings of the present invention. As shown in the illustrated example, the high voltage source to boost the voltage across a capacitor 284 coupled to the bypass BP terminal 280 of control unit 230 may be provided through any external or internal high voltage (HV) node of power converter 200 or controller 230 in accordance with the teachings of the present invention. As was illustrated with the example power converter 100 of FIG. 1 with an external switching element SW 120, the available HV node may be the rectified input voltage of the converter. However, as will be shown in the example depicted in FIG. 2, with an integrated switching element 220 in the controller 230, the boosting signal for the BP supply may be provided through an internal HV node with the drain tap 231 of switching element 220 in accordance with the teachings of the present invention.

To illustrate, the example depicted in FIG. 2 shows a phase controlled rectified ac voltage 212 that is coupled across a filter capacitor 215, which provides an input voltage $V_{in}$ 217 in reference to primary ground node 201. The input voltage $V_{in}$ 217 is applied to terminal D 224 of the controller 230 through the primary winding 241. In one example, an optional clamping circuit 245 may be coupled across primary 241 as shown. The terminal D 224 of controller 230 is coupled to the drain of the switching element 220. In one example, the switching element 220 includes a tap 231, which is coupled to the drain of a MOSFET switch 223 through a JFET 221 as shown. As shown in the depicted example, a switch controller 235 included in controller 230 is coupled to generate gate control signal 238 that is coupled to be received by a gate terminal of switching element 220. Switch controller is further coupled to receive a switch current sense $I_{sns}$ 234 from switching element 220. Switch current sense $I_{sns}$ 234 is representative of a switching current $I_{sw}$ 225 through switching element 220. In the example, switch controller 235 generates the gate control signal 238 based on the converter topology and required control features to control switching of switching element 220. In one example, switch controller 235 is further coupled to receive extra control signals 233 to generate gate control signal 238.

In the depicted example, control unit 230 includes Voltage Regulator With BP Boosting Feature 250, which is coupled to receive a BP boosting signal 232 from tap terminal 231 and a boosting enable signal 257 from terminal 237 of the switch controller 235 in accordance with the teachings of the present invention. In one example, Voltage Regulator With BP Boosting Feature 250 provides the regulated BP voltage 252 to the switch controller 235. The ground pads 236 and 256 of the switch controller 235 and voltage regulator 250, respectively, are coupled to the primary ground 201.

During normal operation, the BP supply voltage used to charge capacitor 284 is provided from an auxiliary winding 243 of the transformer 240, which is rectified and filtered through diode 273, resistor 274, and the auxiliary bulk cap 275 in reference to primary ground 201. Voltage regulator with BP Boosting Feature 250 therefore receives an unregulated, or roughly regulated, BP supply voltage through an RC filter that is provided with resistor 282 and capacitor 284, which are coupled to BP terminal 280 to generate the regulated supply voltage 252, which is coupled to be received by the switch controller 235 as shown.

As shown in the illustrated example, the output load, which for example may be an string of light emitting diodes 268, is fed by output voltage $V_o$ 260 and output current $I_o$ 264. Output voltage $V_o$ 260 and output current $I_o$ 264 are provided from high frequency pulses on secondary winding 242 through rectifying diode 262 and output bulk filter capacitance $C_o$ 265 in reference to reference node 261.

Figure 3:
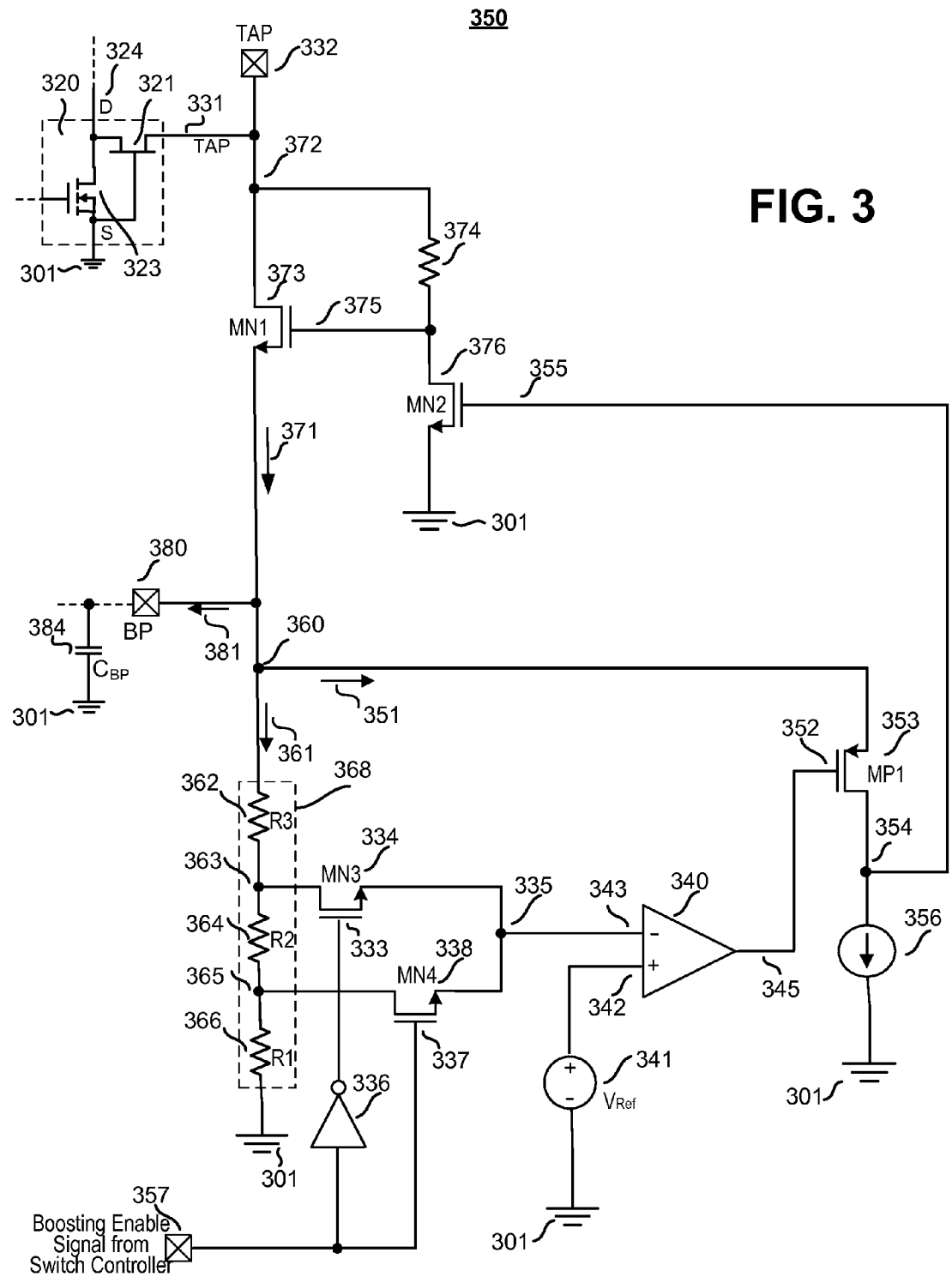
FIG. 3 is a schematic illustrating an example voltage regulator of a flyback power converter in accordance with the teachings of the present invention.

FIG. 3 is a schematic illustrating an example voltage regulator 350 of a power converter, such as for example flyback converter of FIG. 2, in accordance with the teachings of the present invention. For instance, voltage regulator 350 may be an example of the Voltage Regulator With BP Boosting Feature 250 block of FIG. 2. In the example depicted in FIG. 3, tap pad 332 is coupled to receive tap signal 331 from a switching element block 320, which in one example may be an example of switching element 220 of FIG. 2.

As shown in the example depicted in FIG. 3, switching element 320 includes MOSFET 323 and JFET 321. Drain 324 with tap terminal 331 are coupled to tap terminal 332 of the regulator circuit block 350 to provide a BP boosting feature in accordance with the teachings of the present invention. The JFET 321 is coupled to drain 324 of MOSFET switch 323, which is coupled to reference node 301. In the illustrated example, terminal 331 is coupled to BP terminal 380 through a switch MN1 373. Switch MN1 373 includes a control terminal coupled to receive a control signal 375, which is coupled through a pull up resistor 374 to node 372, which is coupled to tap terminal 332. The BP terminal 380 is coupled to node 360, which is coupled to a resistive divider 368. In the illustrated example, resistive divider includes resistors 366 R1, 364 R2 and 362 R3, which are coupled between node 360 and reference node 301 as shown. In one example, a Boosting Enable Signal 357 from switch controller may be received on pad/terminal 357 as a logic signal. Thus in one example, a logic high value for Boosting Enable Signal 357 may be interpreted as an enable, while a logic low value for Boosting Enable Signal 357 may be interpreted as a disable.

Continuing with the depicted example, voltage regulator 350 includes a comparator 340 having a non-inverting input that is coupled to receive a reference voltage Vref 341. Voltage regulator 350 also includes an inverting input 343 that is coupled to node 335, which is coupled to switch MN3 334 and switch MN4 338. Switch MN3 334 and switch MN4 338 are coupled to nodes 363 and 364, respectively, of resistive divider 368 to receive respective scaled down voltages of BP terminal 380. In one example, if the Boosting Enable Signal 357 from switch controller is logic low, which indicates that supply boosting is disabled during normal operation, switch MN4 337 is opened, and switch MN3 334 is closed through inverter 336. As such, the voltage of node 363, which is the voltage drop across resistors R1 366 and R2 364 from the resistive divider 368, is applied to node 335, and is therefore applied to the inverting input 343 of the comparator 340. As a result, a lower value of the scaled BP voltage from node 363 is required to bring node 335 and the inverting input 343 of the comparator 340 to the $V_{ref}$ 341 threshold at the non-inverting input of the comparator 340.

In one example, when the Boosting Enable Signal 357 from switch controller is logic high, it indicates that the boosting function is enabled/activated, which may occur under any condition that a voltage across capacitor 184 falls/drops below a threshold, for example at startup condition. Switch MN4 338 is closed and switch MN3 334 is opened through inverter 336. The voltage across resistor R1 366, as the scaled BP voltage from node 365, is applied to node 335, and is therefore applied to the inverting input 343 of the comparator 340. As a result, in comparison to the condition of boosting function not enabled, a higher value of scaled BP voltage from node 365 is required to bring node 335 and the inverting input 343 of the comparator 340 to the $V_{ref}$ 341 threshold at the non-inverting input of comparator 340.

In the example of boosting function enabled, the scaled BP voltage from node 363 is greater than the scaled BP voltage from node 365. Therefore, the scaled BP voltage from node 365 being applied to the non-inverting input of comparator 340 corresponds to a higher charged voltage on BP capacitor 384 and a higher regulation threshold of BP voltage. In the illustrated example, a higher regulation threshold of the BP voltage occurs when the Boosting Enable Signal 357 from switch controller is logic high, and a lower regulation threshold of the BP voltage occurs when the Boosting Enable Signal 357 from switch controller is logic low.

In operation, either scaled BP voltage from node 363 or scaled BP voltage from node 365 is compared to BP threshold $V_{ref}$ 341 at the non-inverting terminal 342 of the comparator 340. When the scaled BP voltage at the inverting input 343 of the comparator 340 is higher than $V_{ref}$ 341, the output signal 345 of comparator 340 is logic low. Thus, switch MP1 353, which in one example is a P-channel PMOS, is ON in response to a logic low signal on gate 352 of switch MP1 353. Node 354 would then be pulled up to logic high through switch MP1 353, which pulls the gate 355 of switch MN2 376 to high. In one example, switch MN2 376 is an N-channel transistor. With the gate 355 of switch MN2 376 being pulled high, switch MN2 is turned ON, which in turn pulls gate 375 of the N-channel transistor MN1 373 to logic low to turn it OFF. With transistor MN1 373 being turned off, TAP terminal 332 is disconnected from BP terminal 380.

If the scaled BP voltage at inverting input 343 of the comparator 340 drops to a voltage that is less than $V_{ref}$ 341, the output signal 345 of comparator 340 goes to a logic high, which is applied to the gate 352 of switch MP1 353 and turns OFF the switch MP1 353. As a result, node 354 is pulled to a logic low through the current source 356. The logic low at node 354 consequently pulls the gate 355 of switch MN2 376 to a logic low and turns off the switch MN2. By switch MN2 376 turning off, the gate 375 of N-channel transistor MN1 373 is pulled to logic high through the pull up resistor 374 from node 372. When transistor MN1 373 is turned on, the tap terminal 332 connects to the BP terminal 380.

In one example, the voltage difference between nodes 363 and 365 of the resistive divider 368, which defines the difference between the lower (non-boosted) and the higher (boosted) levels of the scaled BP voltage, provides enough hysteresis for a stable operation of the voltage regulator block 350 to differentiate between the BP boosting and non-boosting conditions.

Figure 4A:
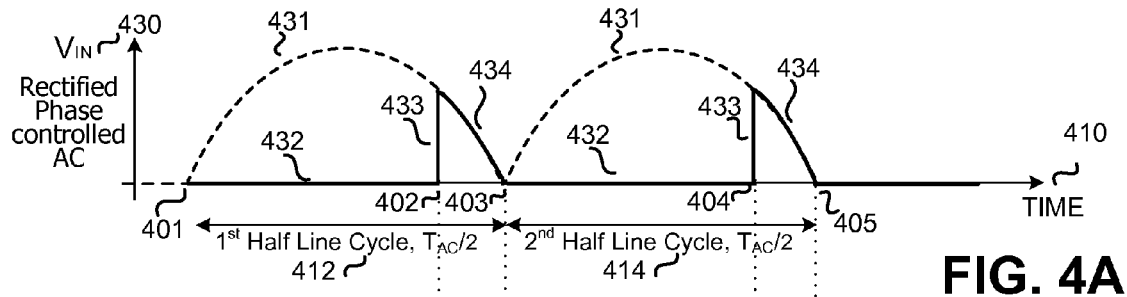
FIGS. 4A and 4B show example waveforms of a low load phase control input voltage and supply terminal voltage that illustrate supply terminal boosting at low load that provides reliable startup without reaching an under voltage threshold in accordance with the teachings of the present invention.
Figure 4B:
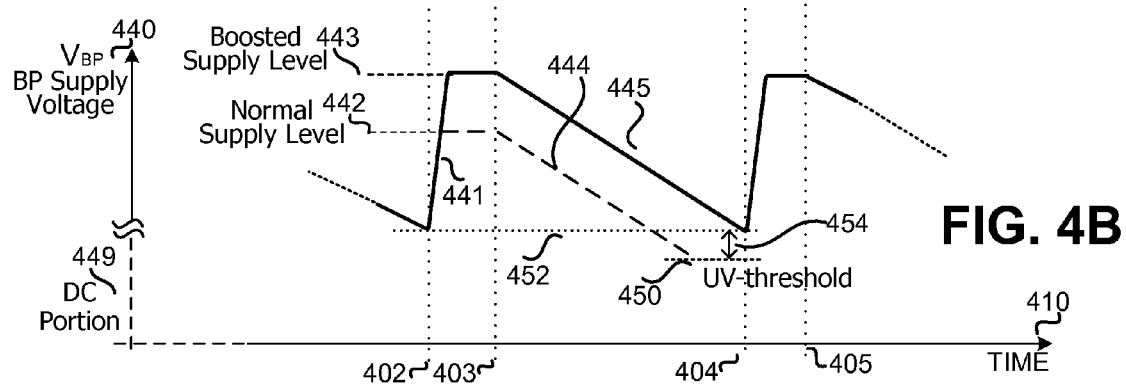
Figure 4C:
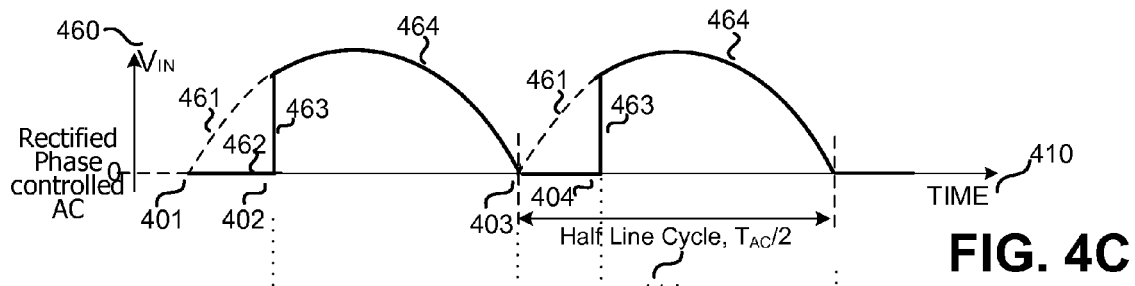
FIGS. 4C and 4D show example waveforms of a high load phase control input voltage and supply terminal voltage that illustrate supply terminal boosting at high load that provides reliable functionality without reaching the under voltage threshold at high load even though the supply terminal discharge time is short, and the slope of the voltage drop at the supply terminal is steep in accordance with the teachings of the present invention.
Figure 4D:
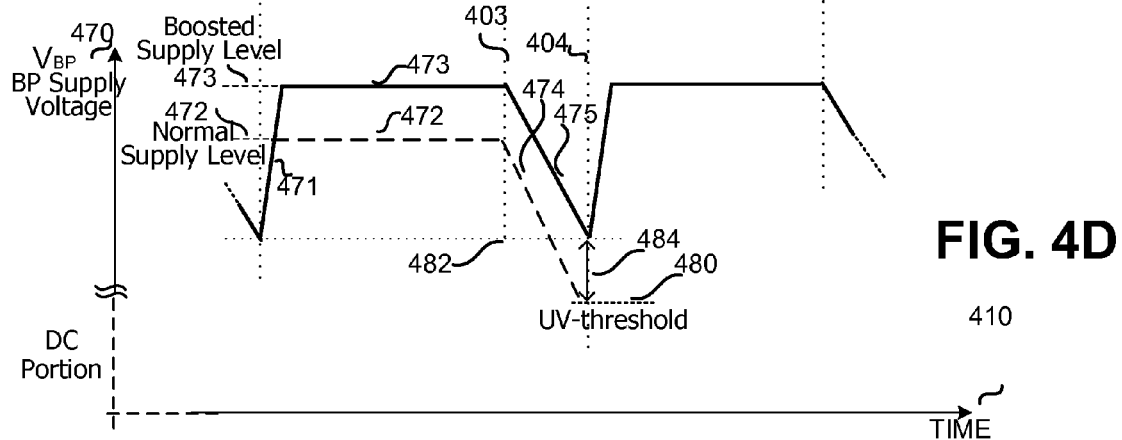

FIGS. 4A and 4B show example waveforms of phase controlled input voltage and supply terminal voltage that illustrate supply terminal boosting at low load. It is appreciated that with supply terminal boosting at low load, reliable startup is provided without reaching an under voltage threshold in accordance with the teachings of the present invention. FIGS. 4C and 4D show example waveforms of a phase controlled input voltage and supply terminal voltage at high load, which illustrate supply terminal boosting to provide reliable functionality without reaching the under voltage threshold in accordance with the teachings of the present invention.

To illustrate, in FIG. 4A the vertical axis presents the rectified phase controlled ac voltage as the input voltage to the power converter Vin 430, which may be an example of waveform 112 of FIG. 1, or an example of waveform 212 FIG. 2. The horizontal axis shows time 410 in the scale of a line cycle. In particular, FIG. 4A shows a line cycle, which is illustrated with two half line cycles, first half line cycle 412 and second half line cycle 414, of rectified phase controlled dimmer voltage Vin 430 to the power converter in deep dimming. The waveform depicted in FIG. 4A illustrates leading edge phase control dimming. The depicted example illustrates a cut portion 432 of the line cycle, which begins at zero crossing point 401 until time 402, which occurs at the rising edge 433. Rising edge 433 is the starting point of the conduction portion 434 of the half line cycle 412, which lasts from time 402 until time 403. Similarly, the second half line cycle begins at time 403 and lasts until time 405.

In the example depicted in FIG. 4A, the dimmer is set to provide a low conduction angle, which provides deep dimming for load including one or more LEDs coupled to the output of the power converter. As shown, the rising edge 433 therefore starts after the peak of the line cycle, as represented with dashed lines 431. The conduction through the dimmer, which follows the line voltage sine-wave 434 after the rising edge 433 and follows the line voltage sine-wave 434 to drop to zero at the end of first half line cycle 412. The second half line cycle 414 shows the same conduction angle as the first half line cycle 412, and starts conducting at time 404 until time 405 at the end of second half line cycle 414.

FIG. 4B shows the BP supply voltage 440 with, and without, the BP boosting feature in accordance with the teachings of the present invention. FIG. 4B is illustrated with the same horizontal time scale 410 as FIG. 4A for two half line cycles. It is noted that the vertical axis 440 presents the bypass BP supply voltage $V_{BP}$ with a broken scale with broken dashed line 449 for the dc portion to save on vertical length of the y-axis. The dashed line 444 in FIG. 4B presents the bypass supply voltage $V_{BP}$ for a normal, or non-boosted, supply level.

When conduction starts, as indicated with the rising edge 433 of the conduction portion in FIG. 4A, the supply voltage $V_{BP}$ as illustrated in FIG. 4B starts from a minimum value 452 and rises or increases with a fast, or steep, slope 441. It is noted that without the BP boosting feature, $V_{BP}$ may rise to the normal supply level 442, which may for example be 5V, and during the conduction period, which occurs during the conduction from time 402 to time 403, $V_{BP}$ remains flat at this level until the end of the conduction time at time 403.

However, during the long non-conducting time interval of the line voltage cut portion 432, such as for example from time 403 until time 404, and especially during startup that the voltage on BP winding still has not increased high enough to charge the BP capacitor, the BP supply voltage 444 drops due to the consumption of power by different internal control blocks within the controller. As shown in FIG. 4B, BP supply voltage 444 may even fall to the under voltage UV threshold 450, which would consequently result in a reset and an auto restart operation of the power converter, causing interruption and further startup delays.

In comparison, the solid line graph 445 in FIG. 4B presents the bypass supply voltage $V_{BP}$, which is boosted with the BP boosting feature activated in accordance with the teachings of the present invention. As shown in the depicted example, when conduction starts, as indicated with the rising edge 433 of the conduction portion in FIG. 4A, the charging of the bypass BP capacitor in accordance with the teachings of the present invention may be boosted from a high voltage node, such as for example from the tap terminal from drain of the power switch. By boosting the bypass BP capacitor from a higher voltage node, the bypass supply voltage $V_{BP}$ charges to a higher initial level 443, which may for example be 5.25 V instead of 5V. In the example, the bypass supply voltage $V_{BP}$ remains at this level until time 403, which is the end of conduction interval.

During the non-conducting interval, from time 403 to time 404, the bypass supply voltage $V_{BP}$ 445 still drops with a slope responsive to the power consumption of the internal control blocks in the controller. Indeed, it is noted that the slopes 444 and 445 are substantially equal in FIG. 4B. However, since the bypass supply voltage $V_{BP}$ has been charged to a higher initial level 443 instead of the normal supply level 442, the bypass supply voltage $V_{BP}$ is therefore shifted to a boosted supply level that is greater than the non-boosted bypass supply level, and remains above the UV threshold with a enough margin 454 throughout the long non-conducting internal from time 403 until time 404 as illustrated in FIG. 4B. Thus, the solid line graph with boosted $V_{BP}$ remains an amount 454, above the UV-threshold 450, even after a long period of voltage drop, as illustrated with a long non-conducting phase angle from time 403 to time 404 in accordance with the teachings of the present invention.

Therefore, it is appreciated that with the feature of boosting the bypass supply voltage in accordance with the teachings of the present invention helps to keep the bypass supply voltage level $V_{BP}$ above the under voltage threshold when operating under more challenging conditions, such as for example a long non-conducting phase angle, which may happen in very deep dimming conditions, or for example with a higher or steeper slope of $V_{BP}$ drop, which will be illustrated below in FIG. 4D. This higher or steeper slope of a $V_{BP}$ drop may occur at low load during startup, at which time the bypass voltage through the auxiliary winding may not have yet reached full charge.

It is appreciated that the BP boosting feature in accordance with the teachings of the present invention is also useful at high loads with high conduction portions or less dimming. For instance, FIGS. 4C and 4D show example waveforms of a phase controlled input voltage, as shown in FIG. 4C, and supply terminal voltage, as shown in FIG. 4D, at a high load with a large conduction angle that illustrates supply terminal boosting effect in accordance with the teachings of the present invention. As will be shown, boosting the bypass supply voltage may help to provide reliable functionality without hitting the under voltage threshold. FIG. 4D illustrates that at high load, even though the discharge time (non-conducting interval) is short, the slope of the voltage drop at the supply terminal is steep due to a higher power consumption of the internal control blocks in the controller.

For instance, FIG. 4C illustrates a rectified phase controlled Dimmer voltage Vin 460 with a high conduction portion. The dashed line in FIG. 4D shows the corresponding BP supply voltage 470, and that after the flat portion 472, which occurs during the conduction portion 464 shown in FIG. 4C, may still fall to the UV threshold without the BP boosting feature, even with a high conduction portion as shown with a small cut portion 462, due to higher or steeper downward slopes 474 of BP voltage as shown in FIG. 4D. As will be shown, however, with the BP boosting feature in accordance with the teachings of the present invention, the solid line in FIG. 4D remains a margin 484 above the UV threshold at level 482 before the start of the next cycle conduction portion in accordance with the teachings of the present invention.

Referring now specifically to the example described in FIG. 4C, the vertical axis presents the rectified phase controlled ac voltage as the input voltage to the power converter Vin 460, which may be an example of waveform 112 of FIG. 1, or an example of waveform 212 FIG. 2. The horizontal axis shows time 410 in the scale of a line cycle. In particular, FIG. 4C shows a line cycle, which is illustrated with two half line cycles of rectified phase controlled dimmer voltage Vin 460 to the power converter with less dimming than the example discussed above with respect to FIGS. 4A and 4B. The waveform depicted in FIG. 4C illustrates leading edge phase control dimming. The depicted example illustrates a cut portion 462 of the line cycle, which begins at zero crossing point 401 until time 402, which occurs at the rising edge 463. Rising edge 463 is the starting point of the conduction portion 464 of the half line cycles, which last from time 402 until time 403, and from time 404 until the conduction portion 464 reaches the x-axis in the second half line cycle 414.

In the example depicted in FIG. 4C, the dimmer is set to provide a large conduction angle. As shown, the rising edge 463 starts before the peak of the line cycle, as represented with solid line during the conduction portion 464. The conduction through the dimmer, which follows the line voltage sine-wave after the rising edge 463 during the conduction portion 464 and drops to zero at the end of each half line cycle. The second half line cycle 414 shows the same conduction angle as the first half line cycle, which starts conducting at time 404 until the conduction portion 464 reaches the x-axis at the end of the second half line cycle 414.

FIG. 4D shows the BP supply voltage 470 with, and without, the BP boosting feature in accordance with the teachings of the present invention. FIG. 4D is illustrated with the same horizontal time scale 410 as FIG. 4C for two half line cycles. It is noted that the vertical axis 470 presents the bypass BP supply voltage $V_{BP}$ with a broken scale with broken dashed line for the dc portion to save on vertical length of the y-axis. The dashed graph 472 in FIG. 4B presents the bypass supply voltage $V_{BP}$ for a normal, or non-boosted, supply level.

When conduction starts, as indicated with the rising edge 463 of the conduction portion 464 in FIG. 4C, the supply voltage $V_{BP}$ as illustrated in FIG. 4D starts from a minimum value 482 and rises or increases with a fast, or steep, slope 471. It is noted that without the BP boosting feature, $V_{BP}$ may rise to the normal supply level 472, which may for example be 5V, and during the conduction portion, which occurs during the conduction from time 402 to time 403, $V_{BP}$ remains flat at this level until the end of the conduction time at time 403.

However, during the non-conducting time interval of the line voltage cut portion 462, which for example occurs from time 403 until time 404 in FIGS. 4C and 4D, and especially during startup that the BP winding still has not been charged enough to charge the BP capacitor, the BP supply voltage 474 drops due to the consumption of power by different internal control blocks within the controller. As shown in FIG. 4D, BP supply voltage 474 may even fall to the voltage UV threshold 480, which would consequently result in a reset and an auto restart operation in the power converter, causing interruption and further startup delays.

In comparison, the solid line graph 475 in FIG. 4D presents the bypass supply voltage $V_{BP}$ that was boosted with the BP boosting feature activated in accordance with the teachings of the present invention. As shown in the depicted example, when conduction starts, as indicated with the rising edge 463 of the conduction portion in FIG. 4C, the bypass BP capacitor in accordance with the teachings of the present invention may be charged from a high voltage node, such as for example from the tap terminal from drain of the power switch. By boosting the bypass BP capacitor from a higher voltage node, the bypass supply voltage $V_{BP}$ charges to a higher initial level 473, such as for example 5.25 V, instead of 5V, and remains at this level until time 403, which is the end of conduction interval.

During the non-conducting interval, from time 403 to time 404, even though the supply BP capacitor discharges due to the power consumption by the internal control blocks in the controller with no external charging source, the bypass supply voltage $V_{BP}$ 475 drops with a slope responsive to the power consumption of the controller blocks in the controller. It is noted that the falling slopes 474 and 475 are substantially equal in FIG. 4D. However, since the bypass supply voltage $V_{BP}$ was charged to a higher initial level 473, the bypass supply voltage $V_{BP}$ is a shifted level greater than the non-boosted bypass supply level, and may therefore remain above the UV threshold with a enough margin 484 as illustrated in FIG. 4D. Thus, the solid line graph with boosted $V_{BP}$ remains an amount 484, above the UV-threshold 480 in accordance with the teachings of the present invention.

FIGS. 5A-5D show the example waveforms for multiple line cycles, similar to the waveforms illustrated above with respect to FIGS. 4A-4B, with a low load and small conduction angle in accordance with the teachings of the present invention. As will be shown, a supply terminal boosting signal increases supply terminal voltage during a short time interval at startup for a reliable operation. By removing the boosting signal after startup, the supply terminal voltage goes back to a normal level, which reduces extra losses in an example power converter in accordance with the teachings of the present invention.

In the illustrated waveforms, a boosting enable signal 580 is generated in response to a detection of a low level drop of the bypass supply voltage $V_{BP}$ at a time 584. When the boosting enable signal 580 changes status from low 582 to high 586, the high voltage node, such as for example the tap terminal from the MOSFET drain, is coupled to boost the bypass supply voltage $V_{BP}$. By coupling the high voltage terminal to the bypass supply voltage $V_{BP}$ in response to the boosting enable signal 580, the charging of the supply terminal capacitor is boosted to increase the BP supply terminal 560 for a short time interval, such as for example during startup in accordance with the teachings of the present invention. As a result, the BP supply terminal voltage 560 increases from the low charging supply level 562 to the high charging supply level 564 by an increased value 566 for a reliable operation. It is appreciated that the BP terminal voltage is regulated at the regular/lower normal level during normal operation to avoid extra losses and inefficiency in the power converter.

Figure 5A:
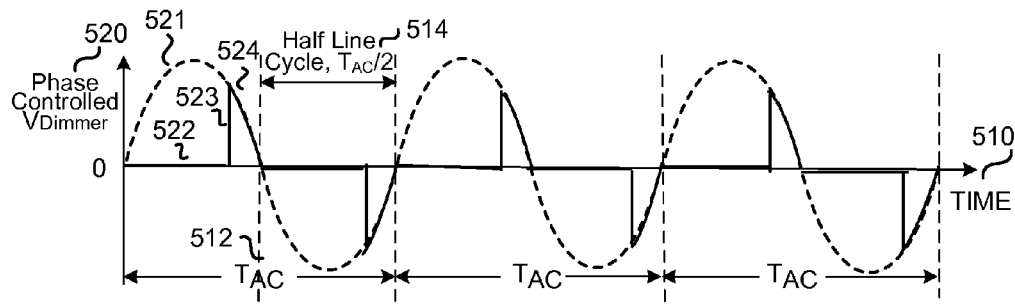
FIGS. 5A-5D show example waveforms for multiple line cycles at low load, with a small conduction angle, and that a supply terminal boosting signal increases supply terminal voltage during a short time interval at startup for a reliable operation, and that by removing the boosting signal after startup, the supply terminal voltage goes back to a normal level avoiding extra losses in an example power converter in accordance with the teachings of the present invention.

To illustrate, FIG. 5A shows three line cycles $T_{AC}$ of the phase controlled dimmer voltage 520 versus time 510. The dashed sinusoidal waveform 521 shows the line ac voltage. The solid line graph presents the phase controlled dimmer voltage with a rising edge 523. The conducting portion 524 of the solid line graph illustrates conduction phase/angle.

Figure 5B:
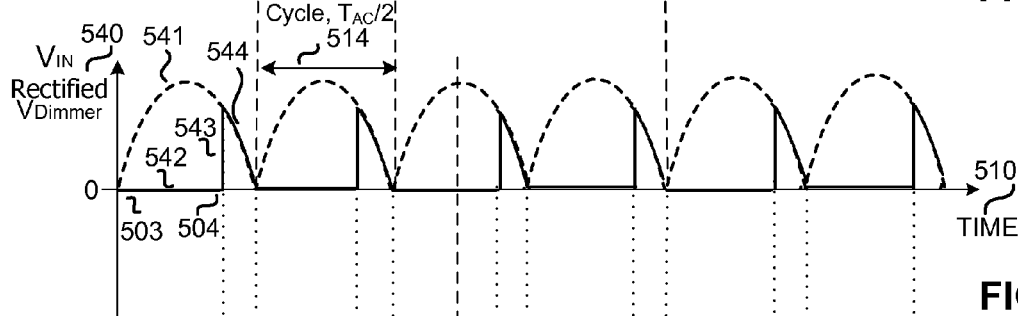

FIG. 5B shows rectified phase controlled dimmer voltage 540 of the phase controlled dimmer voltage 520 illustrated FIG. 5A. As such, FIG. 5B therefore illustrates the half line cycles, $T_{AC}/2$, of the phase controlled dimmer voltage 540 as the input voltage Vin to the power converter versus time 510. The dashed half sinusoidal waveform 541 shows the rectified line ac voltage and the solid line presents the rectified phase controlled dimmer voltage with a rising edge 543 and the conducting portion 544, which therefore illustrates the conduction phase/angle.

Figure 5C:
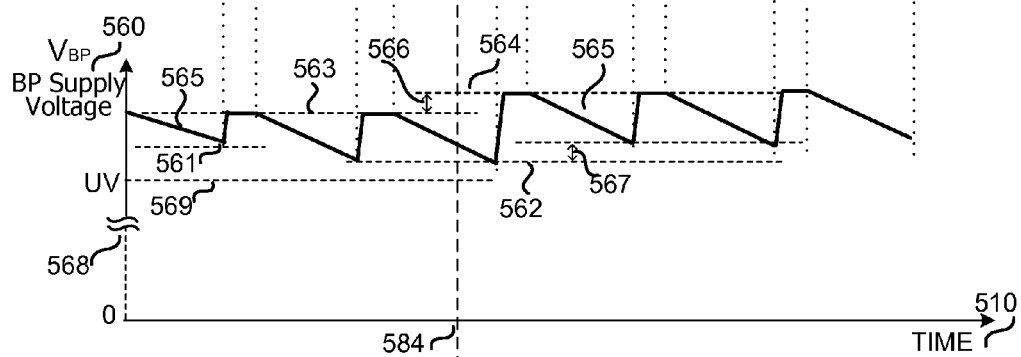

FIG. 5C illustrates the bypass supply voltage $V_{BP}$ 560 versus time 510 for the six half line cycles illustrated in in FIG. 5B. In the depicted example, a low level drop of bypass supply voltage $V_{BP}$ is detected at time 584.

Figure 5D:
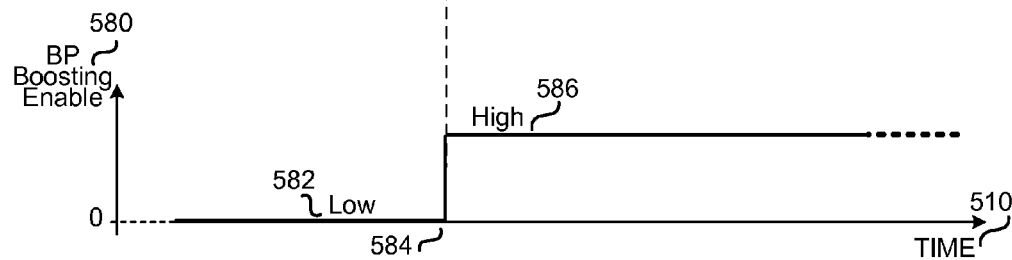

FIG. 5D illustrates the BP boosting enable signal 580 versus time 510. As shown in FIG. 5D, the low level drop of the bypass supply voltage 560 illustrated in FIG. 5C is detected at time 584. As a result, the BP boosting enable signal 580 changes from logic low 582 to logic high 586 in response to the detection of the low threshold level of $V_{BP}$ at time 584. When the BP boosting enable signal 580 is at logic high 586, the high voltage node of the converter, such as for example the input high voltage rectified bus voltage as illustrated in FIG. 1, or the tap terminal form the MOSFET drain as illustrated in FIG. 2, is coupled to boost the charging of the BP capacitor in accordance with the teachings of the present invention.

Referring now back to the example depicted in FIG. 5C, the vertical axis presents the bypass BP supply voltage $V_{BP}$ 560, and the broken dashed line 568 cuts out and scales the dc portion to save on space along vertical length of the y-axis. During the non-conducting time interval, which is the cut portion 542 from time 503 to 504 as illustrated in FIG. 5B, and especially during startup of the power converter that the BP winding has still not been charged high enough to charge the BP capacitor, due to power consumption of the internal control blocks in the controller, the BP supply voltage 565 drops to a low level 561 at next rising edge of conduction angle.

When conduction starts during the conduction interval, the BP supply voltage $V_{BP}$ rises to and stays at level 563, such as for example 5 V, until the next non-conducting interval begins. The BP supply voltage $V_{BP}$ will then drop again at the next non-conducting interval. If the BP supply voltage $V_{BP}$ drops to the UV threshold 569, either due to a high slope drop or a long cut duration, it may cause delay in power up by a reset and auto restart.

Thus, in one example, a low threshold level 562 for the BP supply voltage $V_{BP}$ that is higher than the under voltage threshold 569 is utilized as illustrated in FIG. 5C. When it is detected that the BP supply voltage $V_{BP}$ falls to the low threshold of $V_{BP}$ 562, the BP supply voltage $V_{BP}$ is boosted such that when conduction starts, the supply voltage $V_{BP}$ rises or increases to a high threshold 564 on the $V_{BP}$ capacitor with a fast slope as illustrated. In one example, when the BP supply voltage $V_{BP}$ is in the boosted condition, the high threshold 564 is greater than the normal level 563 during the normal non-boosted condition by an amount 566 as shown. With the BP boosting feature, the supply voltage $V_{BP}$ rises to the high threshold 564, such as for example 5.25 V. As a result of the boosting, with the power consumption by the internal control blocks of the controller, which therefore result in the same downward slopes of the BP supply voltage $V_{BP}$ during the non-conducting intervals, the supply voltage $V_{BP}$ remains above the UV threshold 569 in accordance with the teachings of the present invention.

FIGS. 6A-6D show example waveforms for multiple line cycles, similar to the waveforms illustrated above with respect to FIGS. 4C-4D, with high load and a large conduction angle. In the illustrated example, a supply terminal boosting enable signal is generated in response to the detection of a low level drop of the bypass supply voltage. The boosting enable signal causes the high voltage node, such as for example the tap terminal from the MOSFET drain, to be coupled to boost the charging of supply terminal voltage to increase the supply terminal voltage for a short time interval during startup for a reliable operation.

As will be shown, a boosting enable signal 680 is generated in response to the detection of a low level drop of the bypass supply voltage $V_{BP}$ at a time 684. When the boosting enable signal 680 changes status from logic low 682 to logic high 686, the high voltage node, such as for example the tap terminal from the MOSFET drain, is coupled to boost the BP supply voltage $V_{BP}$. By coupling the high voltage terminal to boost the BP supply voltage $V_{BP}$ in response to the boosting enable signal 680, the charging of the supply terminal capacitor is boosted to increase the BP supply terminal 660 for a short time interval, such as for example during startup in accordance with the teachings of the present invention. As a result, the BP supply terminal voltage 660 increases to the high charging supply level 664 with an increased step value 666 for a reliable operation. It is appreciated that by boosting the bypass supply voltage $V_{BP}$ to a voltage higher than a predefined threshold at startup, and then removing the boosting signal, the BP terminal voltage falls back to the lower normal level during normal operation to avoid extra losses and inefficiency in the power converter.

Figure 6A:
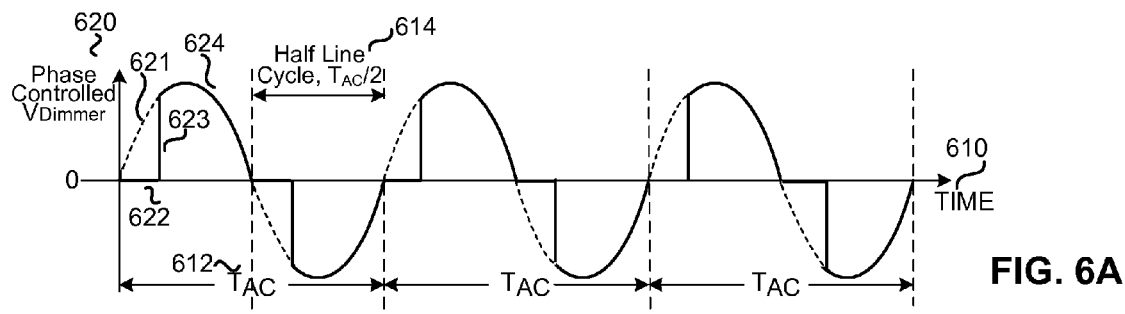
FIGS. 6A-6D show example waveforms for a high load, with a large conduction angle, and that a supply terminal boosting signal provides improved performance in an example power converter in accordance with the teachings of the present invention.

To illustrate, FIG. 6A shows three line cycles $T_{AC}$ of the phase controlled dimmer voltage 620 versus time 610. The dashed sinusoidal waveform 621 shows the line ac voltage. The solid line graph presents the phase controlled dimmer voltage with a rising edge 623. The conducting portion 624 of the solid line graph illustrates conduction phase/angle.

Figure 6B:
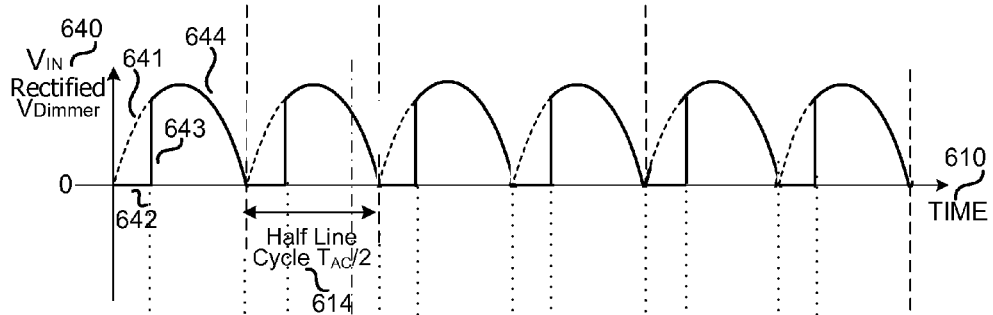

FIG. 6B shows rectified phase controlled dimmer voltage 640 of the phase controlled dimmer voltage 620 illustrated FIG. 6A. As such, FIG. 6B therefore illustrates the half line cycles, $T_{AC}/2$, of the phase controlled dimmer voltage 640 as the input voltage Vin to the power converter versus time 610. The dashed half sinusoidal waveform 641 shows the rectified line ac voltage and the solid line presents the rectified phase controlled dimmer voltage with a rising edge 643 and the conducting portion 644, which therefore illustrates the conduction phase/angle.

Figure 6C:
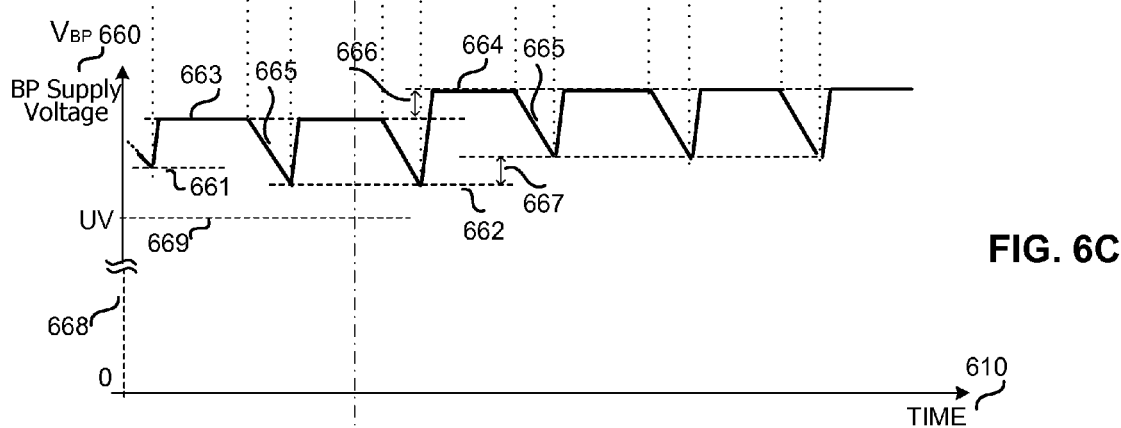

FIG. 6C illustrates the bypass supply voltage $V_{BP}$ 660 versus time 610 for the six half line cycles illustrated in in FIG. 6B. In the depicted example, a low level drop of bypass supply voltage $V_{BP}$ is detected at time 684.

Figure 6D:
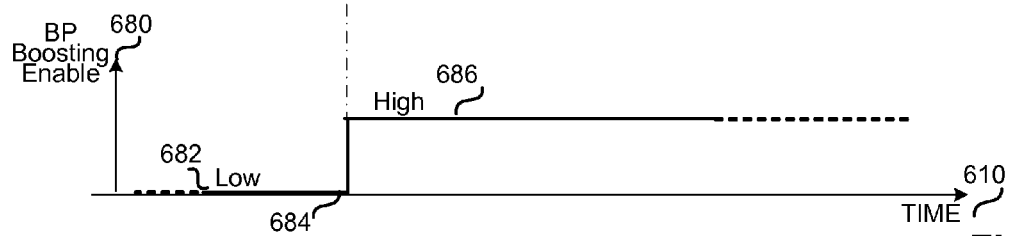

FIG. 6D illustrates the BP boosting enable signal 680 versus time 610. As shown in FIG. 6D, the low level drop of the bypass supply voltage 660 illustrated in FIG. 6C is detected at time 684. As a result, the BP boosting enable signal 680 changes from low 682 to high 686 at time 684 in response to the detection of the low threshold level of $V_{BP}$. When the BP boosting enable signal 680 is at high 686, the high voltage node of the converter, such as for example the input high voltage rectified bus voltage as illustrated in FIG. 1, or the tap terminal form the MOSFET drain as illustrated in FIG. 2, is coupled to boost the charging of the BP capacitor in accordance with the teachings of the present invention.

Referring now back to the example depicted in FIG. 6C, the vertical axis presents the bypass BP supply voltage $V_{BP}$ 660, and the broken dashed line 668 cuts out and scales the dc portion to save on space along vertical length of the y-axis. During the non-conducting time interval, which is the cut portion 642 as illustrated in FIG. 6B, and specifically during startup of the power converter, the BP winding has still not been charged high enough to charge the BP capacitor. Due to power consumption of the control blocks in the controller, the BP supply voltage 665 drops to a low level 661 at next rising edge of conduction angle.

After conduction starts during the conduction interval, the BP supply voltage $V_{BP}$ rises to and stays at level 663, such as for example 5 V, until the next non-conducting interval begins. The BP supply voltage $V_{BP}$ will then drop again at the next non-conducting interval. If the BP supply voltage $V_{BP}$ drops below UV threshold 669, either due to a high slope drop or a long cut duration, it may cause delay in power up by a reset and auto restart.

Thus, in one example, a low threshold level 662 for the BP supply voltage $V_{BP}$ that is higher than the under voltage threshold 669 is utilized as illustrated in FIG. 6C. When the low threshold of $V_{BP}$ 662 is detected, the BP supply voltage $V_{BP}$ is boosted such that when conduction starts, the supply voltage $V_{BP}$ rises or increases to a high threshold 664 on the $V_{BP}$ capacitor with a fast slope as illustrated. In one example, when the BP supply voltage $V_{BP}$ is in the boosted condition, the high threshold 664 is greater than the normal level 663 during the normal non-boosted condition by an amount 666 as shown. With the BP boosting feature, the supply voltage $V_{BP}$ rises to the high threshold 664, such as for example 5.25 V. As a result, with the same controller power consumption condition, which therefore result in the same downward slope during the non-conducting interval help to keep the supply voltage $V_{BP}$ above the UV threshold 669 in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A power conversion device comprising:
   a power switch coupled to isolate in an open state a higher potential portion of the power conversion device from a lower potential portion of the power conversion device, the power switch to provide a current conduction path in a closed state, wherein the power switch comprises
      a first main terminal coupled to the higher potential portion,
      a second main terminal coupled to the lower potential portion,
      a control terminal for switching the power switch between the open state and the closed state, and
      a tap coupled to the first main terminal of the power switch and to the higher potential portion, wherein the tap is coupled to provide a current for charging a supply terminal capacitor;
   a controller coupled to control switching of the power switch between the open state and the closed state to produce a regulated output;
   a supply terminal to be coupled to the supply terminal capacitor to store a charge for supplying power to at least some of the components of the controller; and
   a voltage regulator to regulate the charge stored and a potential on the supply terminal capacitor,
   wherein the current for charging the supply terminal capacitor is selectively drawn from the tap of the power switch in response to the potential on the supply terminal capacitor being below a threshold.

2. The power conversion device of claim 1, wherein the current for charging the supply terminal capacitor is selectively drawn from the tap of the power switch in a startup condition.

3. The power conversion device of claim 1, further comprising a transistor switch coupled between the tap of the power switch and the supply terminal, the transistor switch including a control terminal responsive to a control signal to couple the tap of the power switch to the supply terminal in response to the potential on the supply terminal capacitor being below the threshold and uncouple the tap of the power switch from the supply terminal when the potential on the supply terminal capacitor goes above the threshold.

4. The power conversion device of claim 3, further comprising transistor switch control circuitry coupled to sense the charge stored and the potential on the supply terminal capacitor and control the coupling of the tap of the power switch to the supply terminal.

5. The power conversion device of claim 4, wherein the transistor switch control circuitry comprises a voltage comparator to compare the potential on the supply terminal capacitor with a reference potential and, in response to the potential exceeding the reference potential, uncouple the tap of the power switch from the supply terminal.

6. The power conversion device of claim 5, wherein
   the voltage comparator is coupled to compare the charge stored and potential on the supply terminal capacitor with a first reference potential in response to a boosting enable signal indicating that the storage of the charge on the supply terminal capacitor is to be boosted, and
   the voltage comparator is coupled to compare the charge stored and potential on the supply terminal capacitor with a second reference potential in response to the boosting enable signal indicating that the storage of the charge on the supply terminal capacitor is not to be boosted.

7. The power conversion device of claim 6, wherein
   the voltage comparator selectively compares the charge stored and potential on the supply terminal capacitor with the first reference potential by comparing a first divided portion of the voltage resulting from the charge stored and potential on the supply terminal capacitor with a fixed reference voltage, and
   the voltage comparator selectively compares the charge stored and potential on the supply terminal capacitor with the second reference potential by comparing a second divided portion of the voltage resulting from the charge stored and the potential on the supply terminal capacitor with the fixed reference voltage.

8. The power conversion device of claim 1 wherein
   the power conversion device further comprises an energy transfer element comprising two or more coupled inductors, wherein the current conduction path of the power switch in the closed state includes a first of the coupled inductors, and
   the current for charging the supply terminal capacitor is drawn from a second of the coupled inductors in response to the potential on the supply terminal capacitor being below a threshold, and uncoupled from the tap of the power switch when the potential on the supply terminal capacitor goes above the threshold.

9. The power conversion device of claim 8, wherein the controller outputs the boosting enable signal to indicate that
   the storage of the charge and the potential on the supply terminal capacitor is to be boosted at switching start, and
   the storage of the charge and potential on the supply terminal capacitor is not to be boosted after the second of the coupled inductors exceeds the potential on the supply terminal capacitor.

10. The power conversion device of claim 1 wherein the power switch, the controller, the supply terminal, and the voltage regulator are disposed in a single integrated circuit package.

11. The power conversion device of claim 1, wherein current for charging the supply terminal capacitor is drawn from a second of two or more coupled inductors included in an energy transfer element of the power conversion device when the potential on the supply terminal capacitor goes above the threshold.

12. The power conversion device of claim 1, further comprising:
    a first conductive path coupling the supply terminal capacitor to the tap of the power switch; and
    a second conductive path coupling the supply terminal capacitor to a second of two or more coupled inductors included in an energy transfer element of the power conversion device.

13. The power conversion device of claim 12, wherein the second conductive path comprises a diode coupled to permit conduction of the current for charging the supply terminal capacitor from the second of the coupled inductors to the supply terminal capacitor when a potential at the second of the coupled inductors exceeds the potential on the supply terminal capacitor.

14. A control unit for use in a power converter, comprising:

a switch controller coupled to generate a switch control signal coupled to a switching element, wherein the switching element is coupled to an input return and a first winding of an energy transfer element including the first winding coupled to an input of the power converter, and a second winding coupled to an output of the power converter, wherein a voltage at the input of power converter is a rectified phase controlled dimmer voltage, wherein the switch control signal is coupled to control switching of the switching element to regulate a transfer of energy from the input of the power converter to the output of the power converter in response to the output of the power converter; and a voltage regulator coupled to the switch controller, wherein the voltage regulator includes a supply terminal coupled to a supply terminal capacitor, wherein the supply terminal capacitor is selectively coupled to be charged from the input of the power converter during a startup condition of the power converter, and wherein the supply terminal is selectively coupled to be charged from a third winding of the energy transfer element during a normal operating condition of the power converter.

15. The control unit of claim 14 wherein the supply terminal capacitor is selectively coupled to be charged from the input of the power converter when a voltage on the supply terminal capacitor is less than a threshold, and wherein the supply terminal capacitor is selectively coupled to be charged from the third winding of the energy transfer element when the voltage on the supply terminal capacitor is greater than the threshold.

16. The control unit of claim 14 wherein the switching element includes a MOSFET coupled to a JFET, wherein the JFET includes a tap terminal coupled to provide a boosting through the tap terminal of the JFET from the input of the power converter to a tap terminal of the voltage regulator.

17. The control unit of claim 16 wherein the tap terminal of the voltage regulator is coupled to the supply terminal through a first switch having a gate coupled to the tap terminal of the voltage regulator through a pull up resistor.

18. The control unit of claim 17 wherein the voltage regulator further includes a comparator having a first input coupled to a threshold voltage, and a second input, wherein the second input of the comparator is coupled to receive from a resistor divider coupled between the supply terminal and the input return a first scaled output through a second switch in response to a boosting enable signal from the switch controller having a first value, wherein the second input of the comparator is coupled to receive from the resistor divider a second scaled output through a third switch in response to the boosting enable signal from the switch controller having a second value, wherein the boosting enable signal from the switch controller has the first value during the startup condition of the power converter, and wherein the boosting enable signal from the switch controller has the second value during the normal operating condition of the power converter, wherein the first value of the boosting enable signal during the startup condition is greater than the second value of the boosting enable signal during the normal operating condition.

19. The control unit of claim 18 wherein the second scaled output is greater than the first scaled output, wherein a voltage difference between the second scaled output and the first scaled output provides a higher voltage across the supply terminal capacitor during the startup condition of the power converter than the normal operating condition of the power converter.

20. The control unit of claim 14 wherein a voltage at the supply terminal capacitor is coupled to increase during a rising edge of the rectified phase controlled dimmer voltage, wherein the voltage at the supply terminal capacitor is coupled to remain substantially constant during a conduction portion of the rectified phase controlled dimmer voltage, and wherein the voltage at the supply terminal capacitor is coupled to decrease during a cut portion of the rectified phase controlled dimmer voltage.

21. The control unit of claim 14 wherein the voltage regulator is coupled to regulate a voltage at the supply terminal capacitor at an increased boosted supply level compared to a normal supply level in response to the boosting enable signal.

* * * * *